United States Patent
Park et al.

(10) Patent No.: US 10,259,456 B2
(45) Date of Patent: Apr. 16, 2019

(54) METHOD FOR JOINING DRIVE RANK OF VEHICLE

(71) Applicant: HYUNDAI MOTOR COMPANY, Seoul (KR)

(72) Inventors: Jong Rok Park, Seoul (KR); Dong Gyu Noh, Dongducheon-si (KR); Cho Rong Ryu, Incheon (KR); Dae Sung Hwang, Hwaseong-si (KR); Hahk Rel Noh, Bucheon-si (KR); Su Lyun Sung, Anyang-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 157 days.

(21) Appl. No.: 15/191,104

(22) Filed: Jun. 23, 2016

(65) Prior Publication Data

US 2017/0158196 A1 Jun. 8, 2017

(30) Foreign Application Priority Data

Dec. 8, 2015 (KR) ......................... 10-2015-0174335

(51) Int. Cl.
*B60W 30/165* (2012.01)
*B60K 31/00* (2006.01)
(Continued)

(52) U.S. Cl.
CPC ....... *B60W 30/165* (2013.01); *B60K 31/0058* (2013.01); *B60W 30/18163* (2013.01);
(Continued)

(58) Field of Classification Search
CPC .......... B60K 31/0058; B60W 2550/30; B60W 30/165; B60W 30/18163;
(Continued)

(56) References Cited

U.S. PATENT DOCUMENTS

| 5,680,122 | A | * | 10/1997 | Mio | ..................... | G05D 1/0246 |
| | | | | | | 180/167 |
| 6,115,652 | A | * | 9/2000 | Sato | ..................... | B60W 10/06 |
| | | | | | | 701/117 |

(Continued)

FOREIGN PATENT DOCUMENTS

| DE | 102007024877 A1 | * | 12/2008 | ............. | G08G 1/163 |
| JP | H1139599 A | | 2/1999 | | |

(Continued)

OTHER PUBLICATIONS

Korean Office Action issued in Korean Patent Application 10-2015-0174335, dated Jun. 13, 2017.

*Primary Examiner* — Angelina Shudy
(74) *Attorney, Agent, or Firm* — Morgan Lewis & Bockius LLP

(57) ABSTRACT

A method for joining a driving rank of a vehicle including receiving, by a joining requesting vehicle, information of vehicles in a cooperative adaptive cruise control (CACC) driving rank, transmitting, by the joining requesting vehicle, a joining request message to the vehicles in the CACC driving rank, and receiving, by the vehicles in the CACC driving rank, the joining request message, adjusting, by a rear vehicle and a front vehicle with respect to a position to which the joining requesting vehicle intends to move, among the vehicles in the CACC driving rank, a distance therebetween, determining, by the joining requesting vehicle, whether the joining requesting vehicle is allowed to join the vehicles in the CACC driving rank, and joining, by the joining requesting vehicle, the vehicles in the CACC driving rank and allowing the driving rank to be reconfigured.

7 Claims, 4 Drawing Sheets

(51) Int. Cl.
*H04L 29/08* (2006.01)
*G08G 1/0967* (2006.01)
*G08G 1/00* (2006.01)
*B60W 30/18* (2012.01)
*B60W 50/00* (2006.01)
*G01S 13/93* (2006.01)

(52) U.S. Cl.
CPC . *G08G 1/096725* (2013.01); *G08G 1/096741* (2013.01); *G08G 1/096791* (2013.01); *G08G 1/22* (2013.01); *H04L 67/12* (2013.01); *B60W 2050/008* (2013.01); *B60W 2550/30* (2013.01); *B60W 2550/40* (2013.01); *B60W 2550/408* (2013.01); *G01S 2013/936* (2013.01); *G01S 2013/9325* (2013.01)

(58) Field of Classification Search
CPC ....... B60W 2050/008; B60W 2550/40; B60W 2550/408; G01S 13/00; G01S 2013/9325; G01S 2013/936; G05D 1/0276; G05D 1/0291; G08G 1/096725; G08G 1/096741; G08G 1/096791; G08G 1/22; H04L 67/12
USPC .............................................. 701/2
See application file for complete search history.

(56) References Cited

U.S. PATENT DOCUMENTS

| | | | | |
|---|---|---|---|---|
| 6,128,559 | A * | 10/2000 | Saitou | B61L 23/34 340/436 |
| 9,632,507 | B1 * | 4/2017 | Korn | G05D 1/0293 |
| 9,799,224 | B2 * | 10/2017 | Okamoto | G08G 1/22 |
| 10,001,781 | B2 * | 6/2018 | Nakamura | B60W 30/09 |
| 10,017,180 | B2 * | 7/2018 | Ishioka | B60W 30/143 |
| 2006/0155427 | A1 * | 7/2006 | Yang | G08G 1/07 701/1 |
| 2010/0256852 | A1 * | 10/2010 | Mudalige | G08G 1/163 701/24 |
| 2013/0218365 | A1 * | 8/2013 | Caveney | G05D 1/0295 701/1 |
| 2013/0261948 | A1 * | 10/2013 | Funabashi | G06F 17/00 701/300 |
| 2014/0005906 | A1 * | 1/2014 | Pandita | B60W 30/17 701/96 |
| 2014/0107867 | A1 * | 4/2014 | Yamashiro | G08G 1/22 701/2 |
| 2014/0316671 | A1 * | 10/2014 | Okamoto | G08G 1/22 701/96 |
| 2014/0316865 | A1 * | 10/2014 | Okamoto | G08G 1/22 705/14.1 |
| 2015/0127189 | A1 * | 5/2015 | Mehr | B60W 30/165 701/1 |
| 2015/0294571 | A1 | 10/2015 | Shida et al. | |
| 2016/0267795 | A1 * | 9/2016 | Miyazawa | G08G 1/22 |
| 2016/0267796 | A1 * | 9/2016 | Hiroma | G08G 1/22 |
| 2016/0297447 | A1 * | 10/2016 | Suzuki | B60W 30/16 |
| 2016/0375905 | A1 * | 12/2016 | Park | B60W 30/16 701/96 |
| 2017/0072953 | A1 * | 3/2017 | Nemoto | B60W 30/16 |
| 2017/0072954 | A1 * | 3/2017 | Nemoto | B60W 30/162 |
| 2017/0072956 | A1 * | 3/2017 | Nemoto | B60W 30/162 |
| 2017/0072957 | A1 * | 3/2017 | Nemoto | B60W 30/17 |
| 2017/0106862 | A1 * | 4/2017 | Park | B60W 30/143 |
| 2017/0186327 | A1 * | 6/2017 | Uysal | G08G 1/22 |
| 2017/0329348 | A1 * | 11/2017 | Li | B60K 31/00 |
| 2017/0344023 | A1 * | 11/2017 | Laubinger | G05D 1/0272 |
| 2018/0001892 | A1 * | 1/2018 | Kim | B60W 30/143 |

FOREIGN PATENT DOCUMENTS

| | | |
|---|---|---|
| JP | 2007-048042 A | 2/2007 |
| JP | 2008-158588 A | 7/2008 |
| JP | 2013-084147 A | 5/2013 |
| JP | 2014-078170 A | 5/2014 |
| JP | 2015-022419 A | 2/2015 |
| JP | 2015-022420 A | 2/2015 |
| JP | 2015-022421 A | 2/2015 |
| JP | 2015-022422 A | 2/2015 |
| KR | 1020140068591 | 6/2014 |
| KR | 10-2015-0080604 A | 7/2015 |

\* cited by examiner

METHOD FOR JOINING DRIVE RANK OF VEHICLE

CROSS-REFERENCE TO RELATED APPLICATION

This application claims the benefit of priority to Korean Patent Application No. 10-2015-0174335, filed on Dec. 8, 2015 with the Korean Intellectual Property Office, the disclosure of which is incorporated herein in its entirety by reference.

TECHNICAL FIELD

The present disclosure relates to a method for joining a driving rank of a vehicle, and more particularly, to a method for joining a driving rank of a vehicle based on a cooperative adaptive cruise control (CACC) system.

BACKGROUND

As additional functions of vehicles are increasingly included, a smart cruise control (SCC) system or an electronic stability control (ESC) system, and the like, promoting safety of vehicles has been installed in vehicles.

The SCC system, which may be an inter-vehicle distance control device during driving, may provide a cruise function of sensing a front side of a vehicle through a radar sensor installed on a front portion of the vehicle and allowing a driver to automatically drive the vehicle at a set speed, while maintaining a preset uniform interval with respect to a preceding vehicle, or a speed limit function of controlling a vehicle speed such that the driver does not exceed a preset speed limit.

The SCC system may provide convenience in that the driver does not need to continuously operate an accelerator and/or a brake to adjust a vehicle driving speed and may prevent a vehicle from driving at a speed equal to or higher than a preset speed, ensuring safety driving.

In the related art, in relation to a passage of an SCC vehicle at a crossroad, a method of informing a passing vehicle about a remaining time that the vehicle goes straight has been proposed, and in addition, in a case in which a vehicle due to pass is an ambulance or a fire engine which needs to preferentially be allowed to pass, a method for additionally providing a time remaining after the vehicle has passed in a moving direction has been proposed.

SUMMARY

The present disclosure has been made to solve the above-mentioned problems occurring in the prior art while advantages achieved by the prior art are maintained intact.

An aspect of the present disclosure provides a method for joining a driving rank of a vehicle, in which a vehicle which has received a join request and a preceding vehicle or a subsequent vehicle adjusts a distance therebetween to secure a joining available space to allow a vehicle which has requested joining to move to a space desired by the vehicle, thus securing a safety distance between the vehicles and preventing an accident between vehicles when the vehicle joins a driving rank.

Foregoing technical subjects and any other technical subjects according to an exemplary embodiment of the present disclosure will be understood from the following descriptions and become apparent by exemplary embodiments of the present disclosure. Also, it may be easily understood that the advantages, features and aspects of the present disclosure may be realized by means and combinations demonstrated in claims.

According to an exemplary embodiment of the present disclosure, a method for joining a driving rank of a vehicle may include: receiving, by a joining requesting vehicle, information of vehicles in a cooperative adaptive cruise control (CACC) driving rank; transmitting, by the joining requesting vehicle, a joining request message to the vehicles in the CACC driving rank, and receiving, by the vehicles in the CACC driving rank, the joining request message; adjusting, by a rear vehicle and a front vehicle with respect to a position to which the joining requesting vehicle intends to move, among the vehicles in the CACC driving rank, a distance therebetween; determining, by the joining requesting vehicle, whether the joining requesting vehicle is allowed to join the vehicles in the CACC driving rank; and joining, by the joining requesting vehicle, the vehicles in the CACC driving rank and allowing the driving rank to be reconfigured.

When the vehicles in the CACC driving rank do not receive the joining request message, the joining requesting vehicle may receive again information regarding the vehicles in the CACC driving rank.

In the adjusting of a distance between the rear vehicle and the front vehicle, the distance between the rear vehicle and the front vehicle may be adjusted as the rear vehicle decelerates from a reference speed or the front vehicle accelerates from the reference speed.

According to another exemplary embodiment of the present disclosure, a method for joining a driving rank of a vehicle may include: receiving, by a joining requesting vehicle, information of vehicles in a cooperative adaptive cruise control (CACC) driving rank; comparing, by the joining requesting vehicle, an average speed of the joining requesting vehicle and an average speed of the vehicles in the CACC driving rank; adjusting, by the joining requesting vehicle, a vehicle speed thereof and selecting a closest joining position among joining-available positions in the CACC driving rank; transmitting, by the joining requesting vehicle, a joining request message to a rear vehicle with respect to the closest joining-available position; receiving, by a joining request receiving vehicle, the joining request message and determining whether the joining requesting vehicle is allowed to join; transmitting, by the joining request receiving vehicle, a joining acceptance message to the joining requesting vehicle when the joining requesting vehicle is allowed to join; and joining, by the joining requesting vehicle, the CACC driving rank of the vehicles and allowing the driving rank to be reconfigured.

When the average speed of the joining requesting vehicle is higher than the average speed of the vehicles in the CACC driving rank, the joining requesting vehicle may determine that the joining requesting vehicle can move to a position between a first vehicle and a second vehicle in front of the joining requesting vehicle.

When the average speed of the joining requesting vehicle is lower than the average speed of the vehicles in the CACC driving rank, the joining requesting vehicle may determine that the joining requesting vehicle can move to a position between a second vehicle and a fourth vehicle behind the joining requesting vehicle.

The method may further include: determining, by the joining request receiving vehicle, a condition of a turn signal, a yaw rate, or a deceleration/acceleration signal thereof and automatically transmitting information regarding availability of joining to the joining requesting vehicle, or displaying, by the joining requesting vehicle, a pop-up window indicating whether the joining requesting vehicle is allowed to join, after the joining request receiving vehicle determines whether the joining requesting vehicle is allowed to join.

The method may further include: transmitting, by the joining request receiving vehicle, a joining rejection message to the joining requesting vehicle, when the joining requesting vehicle is not allowed to join.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1A:
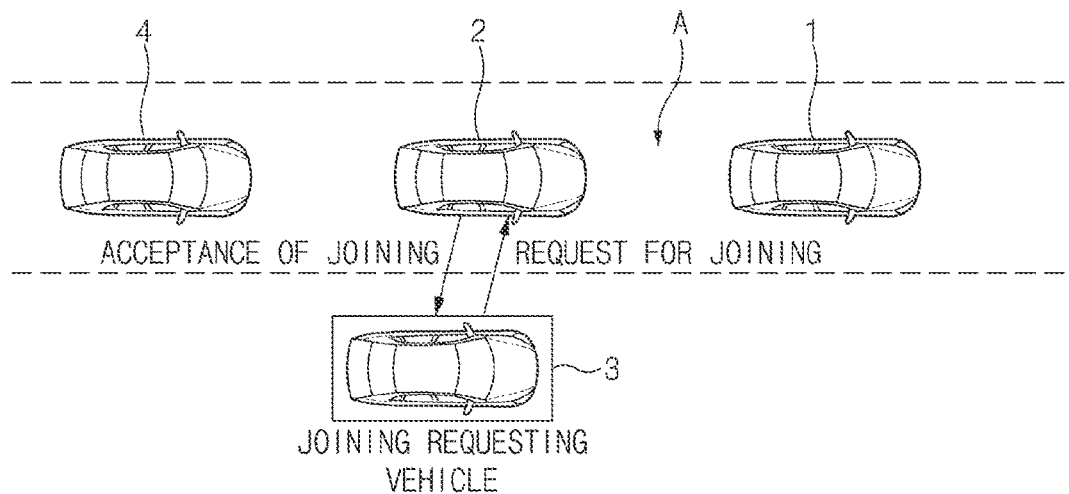
FIGS. 1A, 1B and 1C are views illustrating a method for joining a driving rank, or order, of a vehicle according to exemplary embodiments of the present disclosure.

Advantages and features of the present disclosure, and implementation methods thereof will be described through exemplary embodiments described with reference to the accompanying drawings. The present disclosure may, however, be embodied in different forms and should not be construed as limited to the embodiments set forth herein. Rather, these embodiments are provided to describe the present disclosure so that a technical concept of the present disclosure may be easily practiced by those skilled in the art to which the present disclosure pertains.

In the drawings, the exemplary embodiments of the present disclosure are not limited to a specific form and may be exaggerated for clarity. The specific terms used in the present disclosure are merely used to describe the present disclosure, and are not intended to limit the scope of the present disclosure described in claims.

In the present disclosure, terms "and/or" include at least one of corresponding enumerated items. Also, terms "connected/coupled" may include a direct connection with other component or an indirect connection through other component. In the present disclosure, the singular forms "a," "an" and "the" are intended to include the plural forms as well, unless the context clearly indicates otherwise. It will be further understood that the terms "comprises" and/or "comprising," when used in this specification, specify the presence or addition of stated components, steps, operations, or elements.

Hereinafter, exemplary embodiments of the present disclosure will be described in detail with reference to the accompanying drawings.

An electronic controller unit (ECU) of an own vehicle may receive movement paths of adjacent vehicles using a sensor including a radar of the own vehicle based on a cooperative adaptive cruise control (CACC) system, a scanner, and a sensor including a vehicle to everything (V2X) including communication between a vehicle and every entity such as vehicle to vehicle (V2V), vehicle to infrastructure (V2I), and vehicle to pedestrian (V2P), may transmit/receive a message between a joining requesting vehicle and a joining request receiving vehicle, and may control a method for determining joining a driving rank of a vehicle.

Here, the CACC system may be a system combining a smart cruise control (SCC) system and the V2X scheme, which may be a technique of improving performance of deceleration or acceleration of a vehicle in the SCC system.

Figure 1B:
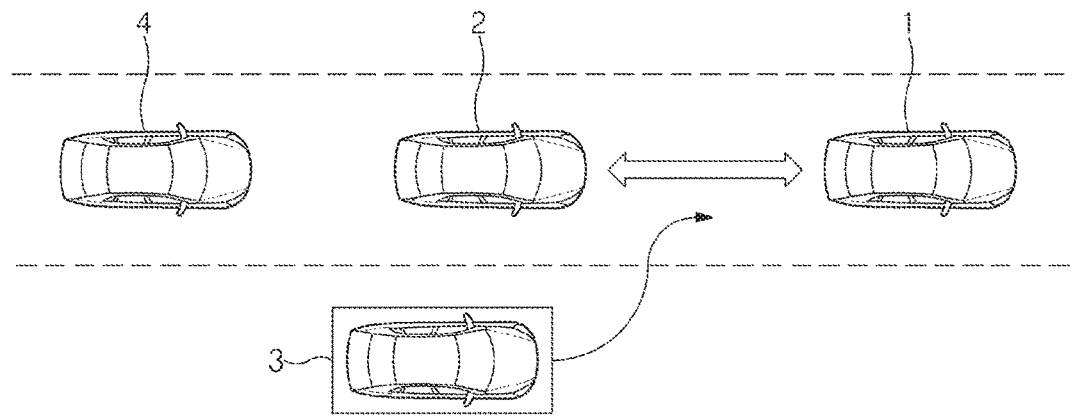
Figure 1C:
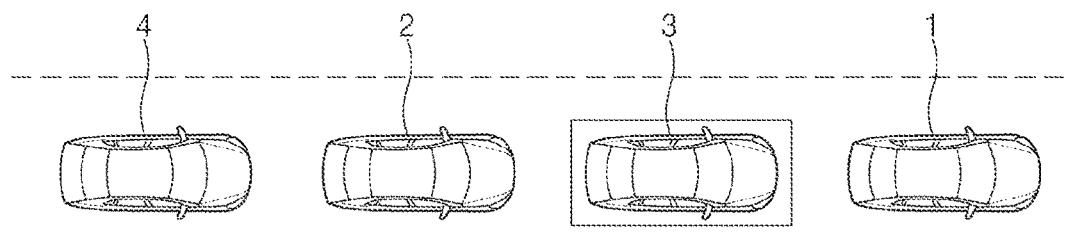

FIGS. 1A, 1B and 1C are views illustrating a method for joining a driving rank, or order, of a vehicle according to an exemplary embodiment of the present disclosure.

Referring to FIGS. 1A, 1B and 1C, a process in which a third vehicle 3 moves to a position A between a first vehicle 1 and a second vehicle 2 in a case in which a plurality of vehicles drive in a row (in case of a CACC driving rank) will be described.

Here, the plurality of vehicles will be described as including a first vehicle 1, a second vehicle 2, a third vehicle 3 and a fourth vehicle 4, for example, and it may be assumed that the first vehicle 1 through the fourth vehicle 4 drive in a row.

Also, the third vehicle 3 may be a joining requesting vehicle and the first vehicle 1, the second vehicle 2, and/or the fourth vehicle 4 may be a joining request receiving vehicle.

Figure 2:
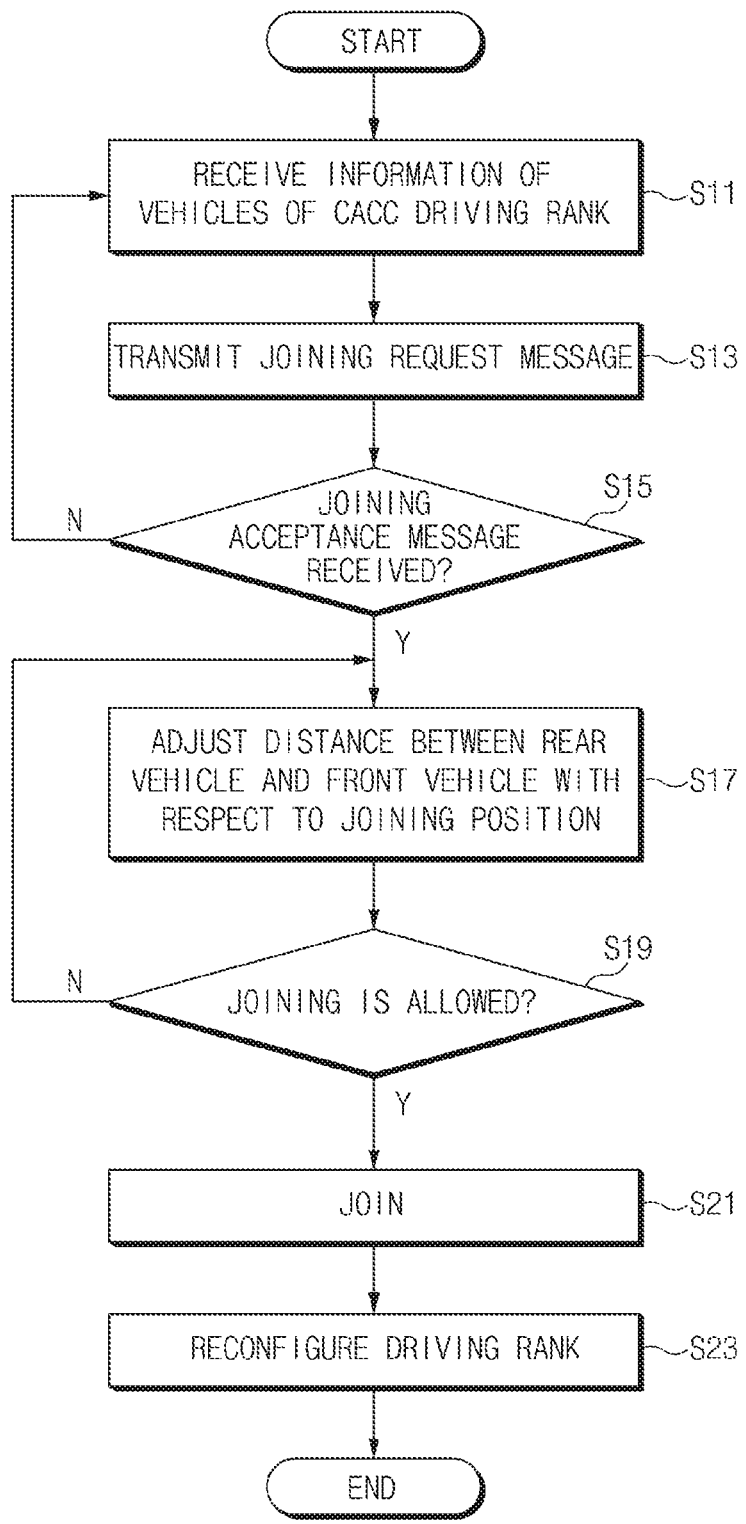
FIG. 2 is a flow chart illustrating a method for joining a driving rank, or order, of a vehicle according to an exemplary embodiment of the present disclosure.

FIG. 2 is a flow chart illustrating a method for joining a driving rank, or order, of a vehicle according to an exemplary embodiment of the present disclosure.

Referring to FIG. 2, first, the joining requesting vehicle (for example, the third vehicle) may receive information of vehicles (for example, the first vehicle, the second vehicle, and the fourth vehicle) in the CACC driving rank in operation S11.

Next, the joining requesting vehicle may transmit a joining request message to the vehicles in the CACC driving rank in operation S13.

The vehicles in the CACC driving rank may receive the joining request message in operation S15.

Here, if, however, the vehicles in the CACC driving rank do not receive the joining request message, the process may be returned to operation S11.

Thereafter, a rear vehicle (the second vehicle) and a front vehicle (the first vehicle) with respect to the position to which the joining requesting vehicle wants to move to, among the vehicles in the CACC driving rank, may mutually adjust a distance therebetween in operation S17.

That is, the rear vehicle (the second vehicle) may decelerate from a reference speed, or the front vehicle (the first vehicle) may accelerate from the reference speed. The distance between the vehicles may be set to a preset distance in advance, or may be adjusted by a driver or a user.

Thereafter, the joining requesting vehicle may determine whether the joining requesting vehicle is allowed to join the vehicles in the CACC driving rank in operation S19.

Thereafter, the joining requesting vehicle may move to a position between the vehicles driving in the CACC driving rank and the driving rank of the vehicles may be reconfigured in operations S21 to S23.

Figure 3:
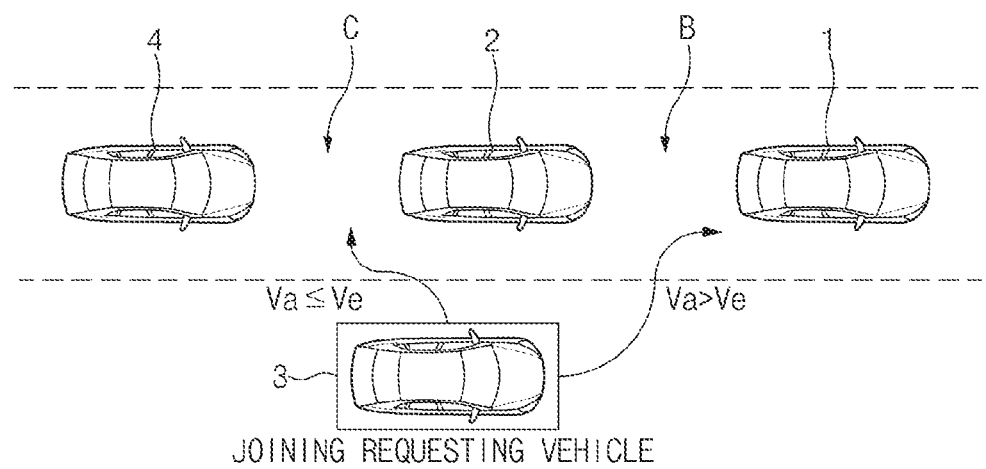
FIG. 3 is a view illustrating a method for joining a driving rank, or order, of a vehicle according to another exemplary embodiment of the present disclosure.

FIG. 3 is a view illustrating a method for joining a driving rank, or order, of a vehicle according to another exemplary embodiment of the present disclosure.

Referring to FIG. 3, a process in which a third vehicle 3 moves to a position B between a first vehicle 1 and a second vehicle 2 or a process in which the third vehicle 3 moves to a position C between the second vehicle 2 and a fourth vehicle 4, in a case in which a plurality of vehicles are driving in a row (in case of a CACC driving rank) will be described.

Here, the plurality of vehicles will be described as including the first vehicle 1, the second vehicle 2, the third vehicle 3 and the fourth vehicle 4, for example, and it may be assumed that the first vehicle 1 to the fourth vehicle 4 are driving in a row.

Here, the third vehicle 3 may be a joining requesting vehicle, and the first vehicle 1, the second vehicle 2, or the fourth vehicle 4 may be a joining request receiving vehicle.

Figure 4:
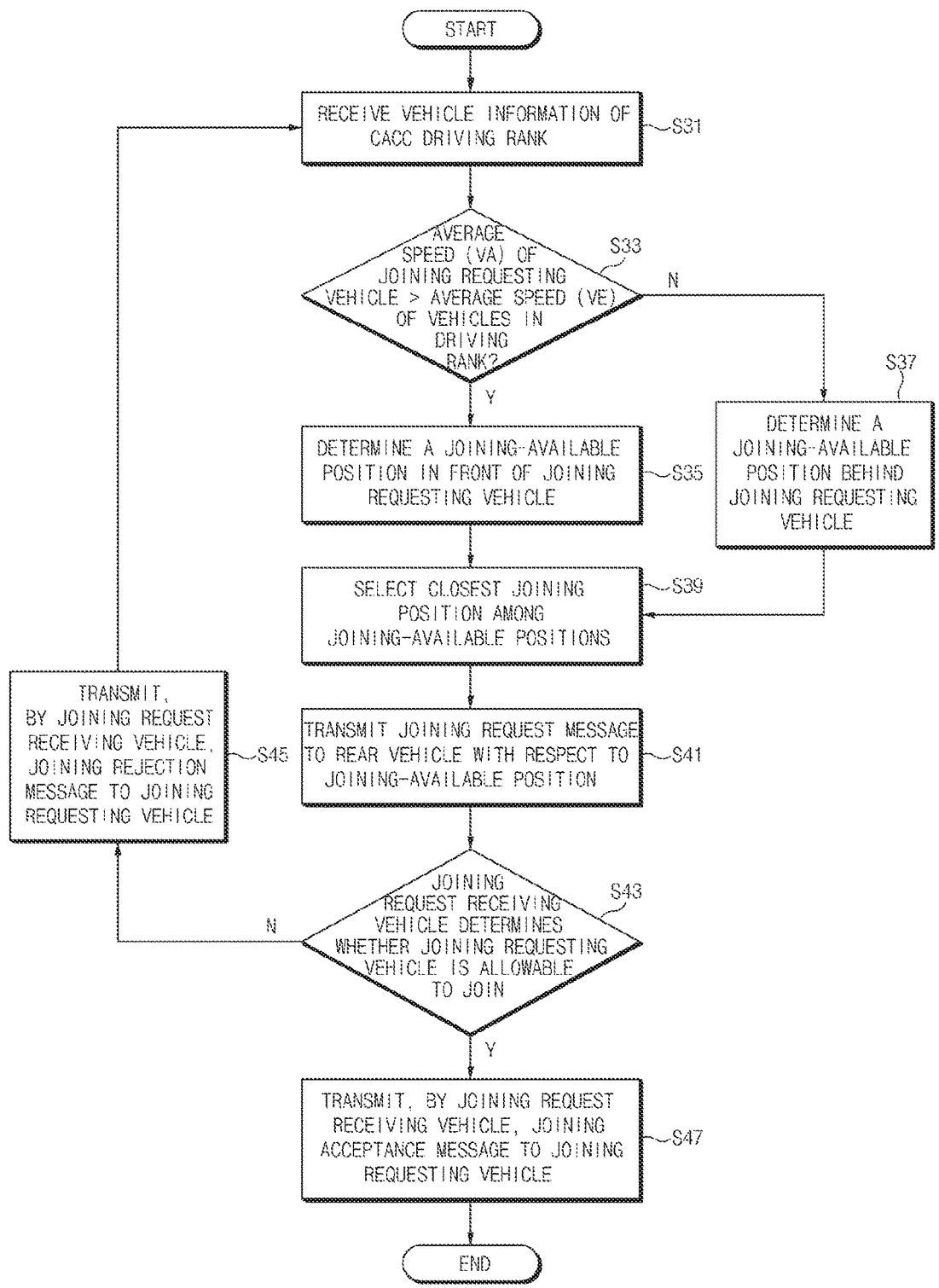
FIG. 4 is a flow chart illustrating a method for joining a driving rank, or order, of a vehicle according to another exemplary embodiment of the present disclosure.

FIG. 4 is a flow chart illustrating a method for joining a driving rank, or order, of a vehicle according to another exemplary embodiment of the present disclosure.

Referring to FIG. 4, first, the joining requesting vehicle (for example, the third vehicle) may receive information of the vehicles (for example, the first vehicle, the second vehicle, and the fourth vehicle) in the CACC driving rank in operation S31.

Next, the joining requesting vehicle may compare an average speed Va of the joining requesting vehicle with an average speed Ve of the vehicles in the CACC driving rank in operation S33.

Here, when the average speed Va of the joining requesting vehicle is higher than the average speed Ve of the vehicles in the CACC driving rank, it may be determined that the joining requesting vehicle can manage to move to a position (the position B of FIG. 3) between the first vehicle and the second vehicle in front of the joining requesting vehicle in operation S35.

If, however, the average speed Va of the joining requesting vehicle is lower than the average speed Ve of the vehicles in the CACC driving rank, it may be determined that the joining requesting vehicle can manage to move to a position (the position C of FIG. 3) between the second vehicle and the fourth vehicle behind the joining requesting vehicle in operation S37.

Thereafter, the joining requesting vehicle may select a closest joining position, among the joining-available positions (B and C of FIG. 3) (or positions to which the joining requesting vehicle may move), by adjusting a speed thereof in operation S39.

Thereafter, the joining requesting vehicle may transmit a joining request message to a rear vehicle (for example, the second vehicle or the fourth vehicle) with respect to a position to which the joining requesting vehicle may move in operation S41. Here, the joining requesting vehicle may transmit a joining request message to a front vehicle with respect to a position to which the joining requesting vehicle may move according to driving situations.

That is, identification (ID) may be transmitted between the joining request vehicle and the joining request receiving vehicles, and vehicle-to-vehicle (V2V) communication method may be used in order to check a joining position between vehicles in the driving rank, or order.

Thereafter, the joining request receiving vehicles may receive the joining request message and determine whether the joining requesting vehicle is allowed to join in operation S43.

In detail, after the joining request receiving vehicles determine whether the joining requesting vehicle is allowed to join, the joining request receiving vehicle may determine a condition of a turn signal, a yaw rate, or a deceleration/acceleration signal thereof and automatically transmit information regarding availability of joining to the joining requesting vehicle, or the joining requesting vehicle may display a pop-up window indicating whether the joining requesting vehicle is allowed to join.

However, when the joining requesting vehicle is not allowed to join the driving rank, the joining request receiving vehicles may transmit a joining unavailability (rejection) message to the joining requesting vehicle in operation S45.

Thereafter, when the joining requesting vehicle is allowed to join the driving rank, the joining request receiving vehicles may transmit a join availability (acceptance) message to the joining requesting vehicle in operation S47.

Thereafter, the joining requesting vehicle may move to a position between the vehicles in the CACC driving rank, and the driving rank may be reconfigured.

As described above, the present technique is able to reduce unnecessary warnings or guidance when vehicles are driving.

The present technique may reduce a risk of collision that may occur between vehicles due to mis-alarming or erroneous guidance when a vehicle passes through a crossroad.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method for joining a driving rank of a vehicle, the method comprising:
   receiving, by a joining requesting vehicle, information of vehicles in a cooperative adaptive cruise control (CACC) driving rank;
   transmitting, by the joining requesting vehicle, a joining request message to the vehicles in the CACC driving rank, and receiving, by the vehicles in the CACC driving rank, the joining request message;
   adjusting, by a rear vehicle and a front vehicle with respect to a position to which the joining requesting vehicle intends to move, among the vehicles in the CACC driving rank, a distance between the rear vehicle and the front vehicle;
   determining, by the joining requesting vehicle, whether the joining requesting vehicle is allowed to join the vehicles in the CACC driving rank; and
   joining, by the joining requesting vehicle, the vehicles in the CACC driving rank and allowing the driving rank to be reconfigured,
   wherein, in the adjusting of the distance between the rear vehicle and the front vehicle, the distance between the rear vehicle and the front vehicle is adjusted as the rear vehicle decelerates from a reference speed and the front vehicle accelerates from the reference speed.

2. The method according to claim 1, wherein when the vehicles in the CACC driving rank do not receive the joining request message, the joining requesting vehicle again receives information regarding the vehicles in the CACC driving rank.

3. A method for joining a driving rank of a vehicle, the method comprising:
   receiving, by a joining requesting vehicle, information of vehicles in a cooperative adaptive cruise control (CACC) driving rank;
   comparing, by the joining requesting vehicle, an average speed of the joining requesting vehicle and an average speed of the vehicles in the CACC driving rank;
   adjusting, by the joining requesting vehicle, a vehicle speed thereof and selecting a closest joining position among joining-available positions in the CACC driving rank, wherein the closest joining position is determined to be in front of the joining requesting vehicle in the CACC driving rank when the average speed of the joining requesting vehicle is higher than the average speed of the vehicles in the CACC driving rank, the closest joining position is determined to be behind the joining requesting vehicle in the CACC driving rank when the average speed of the joining requesting vehicle is lower than the average speed of the vehicles in the CACC driving rank;

transmitting, by the joining requesting vehicle, a joining request message to a rear vehicle with respect to the closest joining-available position;

receiving, by a joining request receiving vehicle, the joining request message and determining whether the joining requesting vehicle is allowed to join;

transmitting, by the joining request receiving vehicle, a joining acceptance message to the joining requesting vehicle when the joining requesting vehicle is allowed to join; and joining, by the joining requesting vehicle, the CACC driving rank of the vehicles and allowing the driving rank to be reconfigured, wherein, in the transmitting of the joining acceptance message to the joining requesting vehicle, the joining request receiving vehicle automatically transmits information regarding availability of joining to the joining requesting vehicle, and the joining requesting vehicle displays a pop-up window indicating whether the joining requesting vehicle is allowed to join, after the joining request receiving vehicle determines whether the joining requesting vehicle is allowed to join.

4. The method according to claim 3, wherein when the average speed of the joining requesting vehicle is higher than the average speed of the vehicles in the CACC driving rank, the joining requesting vehicle determines that the joining requesting vehicle moves to a position between a first vehicle and a second vehicle in front of the joining requesting vehicle.

5. The method according to claim 3, wherein when the average speed of the joining requesting vehicle is lower than the average speed of the vehicles in the CACC driving rank, the joining requesting vehicle determines that the joining requesting vehicle moves to a position between a second vehicle and a third vehicle, which is following the second vehicle and behind the joining requesting vehicle.

6. The method according to claim 3, the joining request receiving vehicle determines a condition of a turn signal, a yaw rate, or both deceleration and acceleration signals thereof and automatically transmits information regarding availability of joining to the joining requesting vehicle.

7. The method according to claim 3, further comprising:
transmitting, by the joining request receiving vehicle, a joining rejection message to the joining requesting vehicle, when the joining requesting vehicle is not allowed to join.

* * * * *